Dec. 26, 1939.  J. H. COHEN  2,184,694
CIGAR LIGHTER
Filed June 7, 1937
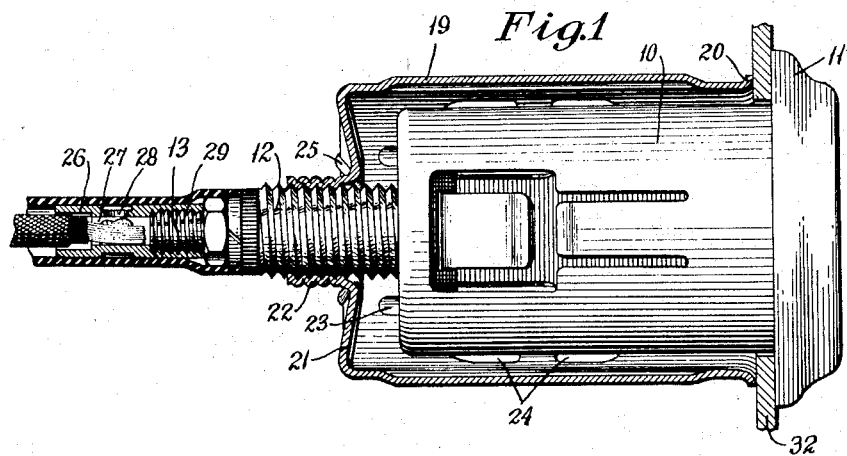
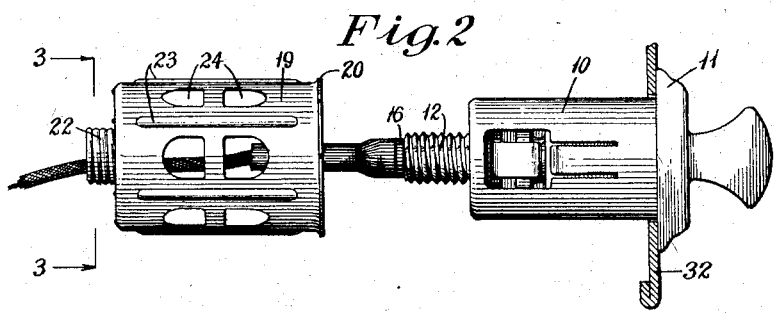
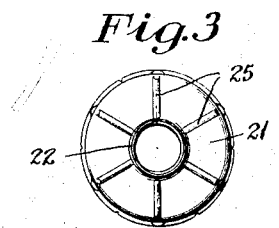
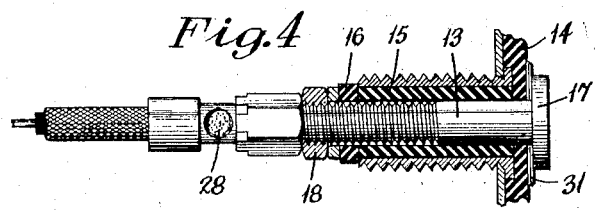
INVENTOR
Joseph H. Cohen,
BY
ATTORNEY Patented Dec. 26, 1939

2,184,694

UNITED STATES PATENT OFFICE 2,184,694

CIGAR LIGHTER

Joseph H. Cohen, Bridgeport, Conn., assignor to Automatic Devices Corporation, Bridgeport, Conn., a corporation of Connecticut Application June 7, 1937, Serial No. 146,804

5 Claims. (Cl. 219—32)

The invention relates to a mounting or locking device and more particularly to a device for mounting a cigar lighter on the dash-board or panel of an automobile.

Much difficulty has been encountered in attaching cigar lighters or the like to a panel or dash-board because of the limited space behind the same within which one must work. The use of tools in this limited space is very undesirable and inconvenient.

According to the present invention, a mounting or locking device has been provided whereby the cigar lighter may be attached to the dash-board without the use of any tools. The mounting device is designed to be manually operated to secure the holder in place but tools can be used if the installation space permits.

When the lighter is used the holder becomes very hot and it is desirable to have the heat removed therefrom as quickly as possible.

According to the present invention, apertures have been provided in the locking shell whereby the heat may be dissipated by radiation.

Also it is desirable to provide a connection between the lighting unit holder and a source of electrical energy in an automobile which includes a connector over which the locking shell may be readily moved when the unit is to be mounted on the dash-board.

In the device of the present invention, a connector is made small enough so that the reduced portion of the locking sleeve may readily pass over the same when being assembled into a locking relation.

More particularly the device of the invention comprises a shell adapted to be mounted on a threaded portion of the holder for the igniting unit and moved by rotation thereof along the threaded portion into locking engagement with the back of the panel.

Other features and advantages will hereinafter appear.

In the drawing:

Figure 1 shows a section of the locking device and connector as mounted on the holding device for the igniting unit.

Fig. 2 is a view of the locking means in position to be moved into locking engagement.

Fig. 3 is an end view of the locking member looking in the direction of arrows 3—3 of Fig. 2.

Fig. 4 is a section of the sleeve showing an electrical connector thereon.

A holding device 10 for the igniting unit of a cigar lighter is provided at one end with an outwardly extending flange 11 which engages the front portion of a panel or dash-board 32 when placed in an aperture therein. The holding member has a threaded sleeve 12 of reduced diameter positioned at its other end and locked thereto as shown in Fig. 4. A bolt 13 is mounted in the sleeve 12 and is insulated from the same by an insulating sleeve 15. A head 17 of the bolt 13 is insulated from the holder 10 by an insulating washer 14. Positioned between the head 17 and washer 14 is a contact 31 for the lighter unit. The bolt is locked in position on the sleeve by a nut 18 threaded thereon and acting against an insulating washer 16 engaging the outer end of the threaded sleeve to lock the bolt in position in the sleeve as shown in Fig. 4.

The locking device, according to the present invention, comprises a tubular shell or barrel 19 of a diameter greater than the diameter of the holding device for the igniting unit. At one end of the shell is a turned-out portion 20 adapted to engage the back of panel 32. At the other end of the shell is a wall 21 connecting the shell or barrel to a reduced neck portion 22. The reduced neck portion has threads rolled therein and is adapted to be screwed along the threaded sleeve 12 so as to move the locking sleeve into locking engagement with the back of plate 32. The wall is provided with a plurality of radially disposed reenforcing ribs 25. The shell also is provided with a plurality of longitudinally disposed reenforcing ribs 23 spaced therearound whereby it is strengthened longitudinally and also is provided with a gripping medium whereby the shell may be gripped manually and turned into intimate contact with the back of the plate. When the igniting unit is used the holder becomes very hot. In order to dissipate the heat from the holder, a plurality of apertures 24 are positioned in the shell to permit the heat of the igniting unit to be dissipated by radiation from the holding means.

The means for connecting the lighter with the source of electrical energy of the automobile according to the present invention comprises a connector having an internal thread 29 at one end thereof adapted to be screwed onto bolt 13. This connector is of reduced diameter so that the locking shell may be readily slipped over the same and into engagement with the threads on sleeve 12. The connector comprises a tubular sleeve having a recess 26 in one end of the bore thereof to permit the end of the insulated cable to be inserted therein. The bare wires of the cable are positioned and secured in a reduced bore 27 by solder supplied thereto through an aperture 28. The other end of the bore has the threads whereby the connector is screwed to the end of bolt 13. The outer surface of the sleeve at this end is made hexagonal to receive a wrench as shown in Fig. 4. A rubber sleeve is mounted over the connector to insulate the same from contact with any metal parts of the automobile.

When assembling the unit on a dash-board the end of the electrical connector is inserted through the reduced neck portion of the locking device and may be carried through the aperture in the dash-board if desired, and screwed to the end of bolt 13. The rubber insulating sleeve is then moved into position to cover the connector. These operations may be performed in front of the dash-board before the holder is put in place. The holder is then positioned in the aperture in the dash-board with its flange 11 in contact with the front surface of the dash-board and the locking sleeve is moved over the connector and into contact with the threaded sleeve 12. The person applying the device then merely reaches up behind the dash-board, grasps the locking device with his hand and turns it so as to thread it along the threaded sleeve and move it into contact with the back of the dash-board. In this manner the holder is securely locked in place. The holder, when locked in engagement with the dash-board, forms the ground connection for the energizing circuit.

Variations and modifications may be made within the scope of this invention and portions of the improvements may be used without others.

I claim:

1. A mounting for a cigar lighter comprising a well or holder for the igniting unit, said well or holder having at one end an outwardly extending flange to engage the margin of an aperture in a mounting panel through which the well or holder extends and having at the other end a transverse wall and a threaded sleeve extending therefrom; and a tubular locking shell constructed and arranged to be threaded on said sleeve so as to substantially encircle said holder in spaced relationship therewith, and having a portion adapted to be moved into locking engagement with the margin of the aperture on the opposite side of the panel.

2. A cigar lighter holding device comprising a socket member having at one end a flange to engage the margin of an aperture in a mounting plate through which the member extends, and having at the other end a transverse wall carrying a rearwardly projecting threaded neck; and a correspondingly shaped securing member adapted to substantially encircle said socket having a flange at one end to engage the margin of the aperture on the opposite side of the mounting plate and having a reduced threaded extension adapted to engage said threaded neck whereby the socket member is clampingly supported on said plate.

3. In a cigar lighter of the removable igniting unit type, a holding device adapted to receive and hold an igniting unit and having a flanged tubular socket to extend through an aperture in a mounting plate with the flange engaging the front side of the plate, said socket having a rear wall carrying a rearwardly projecting threaded nipple forming a conduit for a current-supply wire leading into the socket; and a tubular shell of greater diameter than said socket having a threaded nipple at one end for sleeving the threaded nipple of the socket until the opposite end portion thereof engages the rear side of the plate thereby securely clamping the socket thereto.

4. A cigar lighter holding device comprising a shell adapted to receive and hold a removable igniting unit, said shell having at one end a flange to engage the margin of the aperture in a mounting plate through which the shell extends and having a rear wall carrying a rearwardly projecting threaded sleeve; and a locking member surrounding said shell and having a threaded portion receiving the threaded sleeve of the shell, the end of the locking member opposite said threaded portion adapted to engage the opposite side of the mounting plate when the threaded portion is threaded on the sleeve thereby clamping the shell to the plate.

5. In a cigar lighter of the removable igniting unit type, a holding device adapted to receive and hold an igniting unit and having a flanged perforated tubular socket to extend through an aperture in a mounting plate with the flange engaging the front side of the plate, said socket having a rear wall carrying a rearwardly projecting threaded nipple forming a conduit for a current-supply wire leading into the socket; and a perforated tubular locking member of greater diameter than said holding device having a reduced threaded portion adapted to be mounted on the threaded nipple and moved thereon so as to bring the tubular locking member into engagement with the other side of said plate whereby the socket is clamped to the plate.

JOSEPH H. COHEN.